(12) United States Patent
Santra et al.

(10) Patent No.: US 7,228,905 B2
(45) Date of Patent: Jun. 12, 2007

(54) ZEOLITE COMPOSITIONS HAVING ENHANCED COMPRESSIVE STRENGTH

(75) Inventors: Ashok K. Santra, Duncan, OK (US); Karen Luke, Duncan, OK (US)

(73) Assignee: Halliburton Energy Services, Inc.

( * ) Notice: Subject to any disclaimer, the term of this patent is extended or adjusted under 35 U.S.C. 154(b) by 0 days.

(21) Appl. No.: 11/338,485

(22) Filed: Jan. 24, 2006

(65) Prior Publication Data

US 2006/0137876 A1 Jun. 29, 2006

Related U.S. Application Data

(60) Division of application No. 10/822,459, filed on Apr. 12, 2004, now Pat. No. 7,048,053, which is a continuation-in-part of application No. 10/738,199, filed on Dec. 17, 2003, now Pat. No. 7,150,321, which is a continuation-in-part of application No. 10/727,370, filed on Dec. 4, 2003, now Pat. No. 7,140,439, which is a continuation-in-part of application No. 10/686,098, filed on Oct. 15, 2003, now Pat. No. 6,964,302, which is a continuation-in-part of application No. 10/623,443, filed on Jul. 18, 2003, which is a continuation-in-part of application No. 10/315,415, filed on Dec. 10, 2002, now Pat. No. 6,989,057.

(51) Int. Cl.
E21B 33/138 (2006.01)
C09K 8/42 (2006.01)

(52) U.S. Cl. .................. 166/294; 166/300; 175/72
(58) Field of Classification Search .................. None
See application file for complete search history.

(56) References Cited

U.S. PATENT DOCUMENTS

| 1,943,584 | A | 1/1934 | Cross |
| 2,094,316 | A | 9/1937 | Cross et al. |
| 2,131,338 | A | 9/1938 | Vall |
| 2,349,049 | A | 5/1944 | Means |
| 2,662,827 | A | 12/1953 | Clark |
| 2,727,001 | A | 12/1955 | Rowe |
| 2,848,051 | A | 8/1958 | Williams |
| 3,047,493 | A | 7/1962 | Rosenberg |
| 3,065,170 | A | 11/1962 | Dumbauld et al. |
| 3,293,040 | A | 12/1966 | Shaler, Jr. et al. |

(Continued)

FOREIGN PATENT DOCUMENTS

CA 2153372 9/1996

(Continued)

OTHER PUBLICATIONS

Baroid brochure entitled "Aquagel Gold Seal®" dated 2002.

(Continued)

*Primary Examiner*—Zakiya W. Bates
(74) *Attorney, Agent, or Firm*—Craig W. Roddy; Haynes and Boone, LLP

(57) ABSTRACT

Methods for performing wellbore operations using a treating fluid that includes zeolite, an activator, and an organic acid or salt thereof. The treating fluid used in the methods includes a zeolite having a mean particle size that is less than or equal to 100 microns.

26 Claims, 4 Drawing Sheets

U.S. PATENT DOCUMENTS

| | | |
|---|---|---|
| 3,359,225 A | 12/1967 | Weisend |
| 3,694,152 A | 9/1972 | Sersale et al. |
| 3,781,225 A | 12/1973 | Schwartz |
| 3,884,302 A | 5/1975 | Messenger |
| 3,887,385 A | 6/1975 | Quist et al. |
| 3,888,998 A | 6/1975 | Sampson et al. |
| 3,963,508 A | 6/1976 | Masaryk |
| 4,054,462 A | 10/1977 | Stude |
| 4,141,843 A | 2/1979 | Watson |
| 4,217,229 A | 8/1980 | Watson |
| 4,363,736 A | 12/1982 | Block |
| 4,372,876 A | 2/1983 | Kulprathipanja et al. |
| 4,435,216 A | 3/1984 | Diehl et al. |
| 4,444,668 A | 4/1984 | Walker et al. |
| 4,468,334 A | 8/1984 | Cox et al. |
| 4,474,667 A | 10/1984 | Block |
| 4,482,379 A | 11/1984 | Dibrell et al. |
| 4,515,635 A | 5/1985 | Rao et al. |
| 4,530,402 A | 7/1985 | Smith et al. |
| 4,536,297 A | 8/1985 | Loftin et al. |
| 4,548,734 A | 10/1985 | Chaux et al. |
| 4,552,591 A | 11/1985 | Millar |
| 4,555,269 A | 11/1985 | Rao et al. |
| 4,557,763 A | 12/1985 | George et al. |
| 4,632,186 A | 12/1986 | Boncan et al. |
| 4,650,593 A | 3/1987 | Slingerland |
| 4,676,317 A | 6/1987 | Fry et al. |
| 4,703,801 A | 11/1987 | Fry et al. |
| 4,717,488 A | 1/1988 | Scheult et al. |
| 4,772,307 A | 9/1988 | Kiss et al. |
| 4,784,693 A | 11/1988 | Kirkland et al. |
| 4,818,288 A | 4/1989 | Aignesberger et al. |
| 4,888,120 A | 12/1989 | Mueller et al. |
| 4,943,544 A | 7/1990 | McGarry et al. ........... 501/124 |
| 4,986,989 A | 1/1991 | Sirosita et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,151,131 A | 9/1992 | Burkhalter et al. |
| 5,238,064 A | 8/1993 | Dahl et al. |
| 5,252,554 A | 10/1993 | Mueller et al. |
| 5,301,752 A | 4/1994 | Cowan et al. |
| 5,307,876 A | 5/1994 | Cowan et al. |
| 5,314,022 A | 5/1994 | Cowan et al. |
| 5,340,860 A | 8/1994 | Brake et al. |
| 5,346,012 A | 9/1994 | Heathman et al. |
| 5,383,967 A | 1/1995 | Chase |
| 5,435,846 A | 7/1995 | Tatematsu et al. |
| 5,464,060 A | 11/1995 | Hale et al. |
| 5,494,513 A | 2/1996 | Fu et al. |
| 5,501,276 A | 3/1996 | Weaver et al. |
| 5,527,387 A | 6/1996 | Andersen et al. ........... 106/693 |
| 5,529,624 A | 6/1996 | Riegler |
| 5,588,489 A | 12/1996 | Chatterji et al. |
| 5,626,665 A | 5/1997 | Barger et al. |
| 5,658,624 A | 8/1997 | Anderson et al. .......... 428/34.7 |
| 5,680,900 A | 10/1997 | Nguyen et al. |
| 5,711,383 A | 1/1998 | Terry et al. |
| 5,716,910 A | 2/1998 | Totten et al. |
| 5,759,964 A | 6/1998 | Schuchart et al. |
| 5,788,762 A | 8/1998 | Barger et al. |
| 5,789,352 A | 8/1998 | Carpenter et al. |
| 5,807,910 A | 9/1998 | Blezard et al. |
| 5,851,960 A | 12/1998 | Totten et al. |
| 5,866,517 A | 2/1999 | Carpenter et al. |
| 5,913,364 A | 6/1999 | Sweatman |
| 5,964,692 A | 10/1999 | Blezard et al. |
| 5,980,446 A | 11/1999 | Loomis et al. |
| 5,990,052 A | 11/1999 | Harris |
| 6,060,434 A | 5/2000 | Sweatman et al. |
| 6,063,738 A | 5/2000 | Chatterji et al. |
| 6,070,664 A | 6/2000 | Dalrymple et al. |
| 6,138,759 A | 10/2000 | Chatterji et al. |
| 6,145,591 A | 11/2000 | Boncan et al. |
| 6,149,724 A | 11/2000 | Ulibarri et al. |
| 6,153,562 A | 11/2000 | Villar et al. |
| 6,167,967 B1 | 1/2001 | Sweatman |
| 6,170,575 B1 | 1/2001 | Reddy et al. |
| 6,171,386 B1 | 1/2001 | Sabins |
| 6,176,315 B1 | 1/2001 | Reddy et al. |
| 6,182,758 B1 | 2/2001 | Vijn |
| 6,209,646 B1 | 4/2001 | Reddy et al. |
| 6,210,476 B1 | 4/2001 | Chatterji et al. |
| 6,213,213 B1 | 4/2001 | van Batenburg et al. |
| 6,230,804 B1 | 5/2001 | Mueller et al. |
| 6,234,251 B1 | 5/2001 | Chatterji et al. |
| 6,235,809 B1 | 5/2001 | Arias et al. |
| 6,245,142 B1 | 6/2001 | Reddy et al. |
| 6,258,757 B1 | 7/2001 | Sweatman et al. |
| 6,283,213 B1 | 9/2001 | Chan |
| 6,312,515 B1 | 11/2001 | Barlet-Gouedard et al. |
| 6,315,042 B1 | 11/2001 | Griffith et al. |
| 6,372,694 B1 | 4/2002 | Osinga et al. |
| 6,379,456 B1 | 4/2002 | Heathman et al. |
| 6,390,197 B1 | 5/2002 | Maroy |
| 6,405,801 B1 | 6/2002 | Vijn et al. |
| 6,409,819 B1 | 6/2002 | Ko |
| 6,457,524 B1 | 10/2002 | Roddy |
| 6,475,275 B1 | 11/2002 | Nebesnak et al. |
| 6,478,869 B2 | 11/2002 | Reddy et al. |
| 6,488,091 B1 | 12/2002 | Weaver et al. |
| 6,494,951 B1 | 12/2002 | Reddy et al. |
| 6,508,305 B1 | 1/2003 | Brannon et al. |
| 6,524,384 B2 | 2/2003 | Griffith et al. |
| 6,555,505 B1 | 4/2003 | King et al. |
| 6,565,647 B1 | 5/2003 | Day et al. |
| 6,566,310 B2 | 5/2003 | Chan |
| 6,572,698 B1 | 6/2003 | Ko |
| 6,593,402 B2 | 7/2003 | Chatterji et al. |
| 6,607,035 B1 | 8/2003 | Reddy et al. |
| 6,610,139 B2 | 8/2003 | Reddy et al. |
| 6,616,753 B2 | 9/2003 | Reddy et al. |
| 6,626,243 B1 | 9/2003 | Boncan |
| 6,626,991 B1 | 9/2003 | Drochon et al. |
| 6,630,021 B2 | 10/2003 | Reddy et al. |
| 6,645,289 B2 | 11/2003 | Sobolev et al. |
| 6,656,265 B1 | 12/2003 | Garnier et al. |
| 6,656,266 B1 | 12/2003 | Barlet-Gouedard et al. |
| 6,660,080 B2 | 12/2003 | Reddy et al. |
| 6,702,044 B2 | 3/2004 | Reddy et al. |
| 6,713,553 B2 | 3/2004 | Gonnon et al. |
| 6,719,055 B2 | 4/2004 | Mese et al. |
| 6,722,434 B2 | 4/2004 | Reddy et al. |
| 6,729,405 B2 | 5/2004 | DiLullo et al. |
| 6,737,385 B2 | 5/2004 | Todd et al. |
| 6,743,288 B2 | 6/2004 | Eoff et al. |
| 6,752,866 B2 | 6/2004 | Gonnon et al. |
| 6,767,868 B2 | 7/2004 | Dawson et al. |
| 6,786,966 B1 | 9/2004 | Johnson et al. |
| 6,832,652 B1 | 12/2004 | Dillenbeck et al. |
| 6,840,319 B1 | 1/2005 | Chatterji et al. |
| 6,840,996 B2 | 1/2005 | Morioka et al. |
| 6,889,767 B2 | 5/2005 | Reddy et al. |
| 7,137,448 B2 | 11/2006 | Arias et al. ................. 466/292 |
| 7,182,137 B2 | 2/2007 | Fyten et al. |
| 2001/0014651 A1 | 8/2001 | Reddy et al. |
| 2002/0077390 A1 | 6/2002 | Gonnon et al. |
| 2002/0091177 A1 | 7/2002 | Gonnon et al. |
| 2002/0117090 A1 | 8/2002 | Ku |
| 2002/0157575 A1 | 10/2002 | DiLullo et al. |
| 2003/0066460 A1 | 4/2003 | Reddy et al. |
| 2003/0092582 A1 | 5/2003 | Reddy et al. |
| 2003/0096945 A1 | 5/2003 | Eoff et al. |

| | | | |
|---|---|---|---|
| 2003/0153466 A1 | 8/2003 | Allen et al. |
| 2003/0168215 A1 | 9/2003 | Drochon et al. |
| 2003/0181543 A1 | 9/2003 | Reddy et al. |
| 2003/0203996 A1 | 10/2003 | Gonnon et al. |
| 2003/0217847 A1 | 11/2003 | Reddy et al. |
| 2004/0007162 A1 | 1/2004 | Morioka et al. |
| 2004/0007360 A1 | 1/2004 | Leroy-Delage et al. |
| 2004/0035331 A1 | 2/2004 | Volpert |
| 2004/0040475 A1 | 3/2004 | Roij |
| 2004/0040712 A1 | 3/2004 | Ravi et al. |
| 2004/0069537 A1 | 4/2004 | Reddy et al. |
| 2004/0069538 A1 | 4/2004 | Reddy et al. |
| 2004/0094331 A1 | 5/2004 | Mese et al. |
| 2004/0107877 A1 | 6/2004 | Getzlaf et al. |
| 2004/0108113 A1 | 6/2004 | Luke et al. |
| 2004/0112255 A1 | 6/2004 | Bruno et al. |
| 2004/0112600 A1 | 6/2004 | Luke et al. |
| 2004/0168803 A1 | 9/2004 | Reddy et al. |
| 2004/0187740 A1 | 9/2004 | Timmons |
| 2004/0188091 A1 | 9/2004 | Luke et al. |
| 2004/0188092 A1 | 9/2004 | Santra et al. |
| 2004/0244977 A1 | 12/2004 | Luke et al. |
| 2004/0262000 A1 | 12/2004 | Morgan et al. |
| 2004/0262001 A1 | 12/2004 | Caveny et al. |
| 2005/0000734 A1 | 1/2005 | Getzlaf et al. |
| 2005/0034864 A1 | 2/2005 | Caveny et al. |
| 2005/0133222 A1 | 6/2005 | Arias et al. |

FOREIGN PATENT DOCUMENTS

| | | |
|---|---|---|
| EP | 0 802 253 A1 | 10/1997 |
| EP | 0 895 971 A1 | 2/1999 |
| EP | 0 621 247 B1 | 7/1999 |
| EP | 1 260 491 A1 | 11/2002 |
| EP | 1 428 805 A1 | 4/2003 |
| EP | 1 428 805 A1 | 6/2004 |
| FR | 763.998 | 5/1937 |
| GB | 1469954 | 4/1977 |
| GB | 2 353 523 A | 2/2001 |
| JP | J52117316 | 10/1977 |
| JP | 61-21947 | 1/1986 |
| JP | J07003254 | 6/1995 |
| JP | J10110487 | 4/1998 |
| RU | SU1373781 | 2/1988 |
| WO | WO 97/28097 | 8/1997 |
| WO | WO 98/54108 | 12/1998 |
| WO | WO 00/50357 | 8/2000 |
| WO | WO 01/70646 A1 | 9/2001 |
| WO | WO 2005/059301 A1 | 6/2005 |

OTHER PUBLICATIONS

Baroid Fluid Services brochure entitled "BARAZAN® Viscosifier/Suspension Agent" dated 2005.
Halliburton brochure entitled "CFR-2 Cement Friction Reducer" dated 1999.
Halliburton brochure entitled "CFR-3 Cement Friction Reducer" dated 1998.
Halliburton brochure entitled "D-Air 2 Anti-Foam Agent" dated 1999.
Baroid Fluid Services brochure entitled "DURATONE®HT Filtration Control Agent" dated 2005.
Baroid Fluid Services brochure entitled "EZ-MUD® Shale Stabilizer" dated 2005.
Baroid Fluid Services brochure entitled "EZ MUL® Emulsifier" dated 2005.
Baroid Fluid Services brochure entitled "EZ MUL® NTE Emulsifier" dated 2005.
Baroid Fluid Services brochure entitled "GELTONE® II Viscosifier" dated 2005.
Baroid Fluid Services brochure entitled "GELTONE® V Viscosifier" dated 2005.
Halliburton brochure entitled "Halad®-344 Fluid-Loss Additive" dated 1998.
Halliburton brochure entitled "Halad®-413 Fluid-Loss Additive" dated 1999.
Halliburton brochure entitled "HR®-5 Cement Additive" dated 1998.
Halliburton brochure entitled "HR®-7 Cement Retarder" dated 1999.
Baroid Fluid Services brochure entitled "INVERMUL® Emulsifier" dated 2005.
Halliburton brochure entitled "MICROSAND Cement Additive" dated 1999.
Halliburton brochure entitled "SSA-1Strength-Stabilizing Agent" dated 1998.
Halliburton brochure entitled "SSA-2 Coarse Silica Flour" dated 1999.
Sersale, R. et al., "Portland-Zeolite-Cement For Minimizing Alkali-Aggregate Expansion" Cement and Concrete Research, vol. 17, pp. 404-410.
"Hydraulic engineering cement", International Center for Materials Technology Promotion, 2003.
"Portland Cement, Concrete, and Heat of Hydration", Portland Cement Association, Concrete Technology Today, vol. 18, No. 2, 1997.
Atkins, M. et al., "Zeolite P In Cements: Its Potential For Immobilizing Toxic and Radioactive Waste Species," pp. 127-135. (undated).
Powder Diffraction File, International Centre for Diffraction Data, 2002.
Underdown, D.R. et al., "Acidization of Analcime-Cemented Sandstone, Gulf of Mexico", SPE 20624, dated 1990.
Rogers, B.A. et al., "Designing a Remedial Acid Treatment for Gulf of Mexico Deepwater Turbidite Sands Containing Zeolite Cement," SPE 39595, dated 1998.
Bruhn, R.L. et al., "Tectonics, fluid migration, and fluid pressure in a deformed forearc basin, Cook Inlet, Alaska," dated 2000.
Brown, K.M., Hydraulic Conductivity Measurements on Discrete Samples Collected From Leg 141, Site 863, pp. 401-405. (undated).
Komarneni, S. et al., "Alteration of Clay Minerals and Zeolites in Hydrothermaly Brines" dated 1983.
Bartlet-Gouedard, V. et al., "A Non-Conventional Way of Developing Cement Slurry for Geothermal Wells," pp. 85-91. (undated).
Marfil, S.A. et al., "Zeolite Crystallization in Portland Cement Concrete," pp. 1283-1288. (undated).
Poon, C.S. et al., "A study on the hydratino rate of natural zeolite blended cement pastes" dated 1999.
Feng, N-Q et al., "Zeolite ceramsite cellular concrete" pp. 117-112, dated 2000.
Bagosi, S. et al., "Immobilization of caesium-loaded ion exchange resins in zeolite-cement blends" pp. 479-485,d ated 1999.
"Effect of Bentonite and Zeolite on Durability of Cement Suspension under Sulfate Attack," ACI Materials Journal, pp. 710-715, dated 1998.
Su, N. et al., "Reuse of waste catalysts from petrochemical industries for cement substitution," pp. 1773-1783, dated 2000.
Ding, Jian-Tong et al., "Extreme vertices design of concrete with combined mineral admixtures," dated 1999.
Naiqian, F. et al., "Study on the suppression effect of natural zeolite on expansion on concrete dude to alkali-aggregate reaction," pp. 17-24, dated 1998.
Chan, S. et al., "Comparative study of the initial surface absorption and chloride diffusion of high performance zeolite, silica fume and PFA concretes,"pp. 293-300. (undated).
Poon, C.S. et al., "A study on the hydration rate of natural zeolite blended cement pastes," pp. 427-432, dated 1999.
Janotka, I., "The properties of Mortar Using Blends With Portland Cement Clinker, Zeolite Tuff and Gypsum", dated 1992.
Foreign communication from a related counterpart application dated Mar. 25, 2004.
Foreign communication from a related counterpart application dated Aug. 23, 2004.
Foreign communication from a related counterpart application dated Jul. 28, 2005.
Foreign communication from a related counterpart application dated Nov. 4, 2005.
Foreign communication from a related counterpart application dated Nov. 25, 2004.

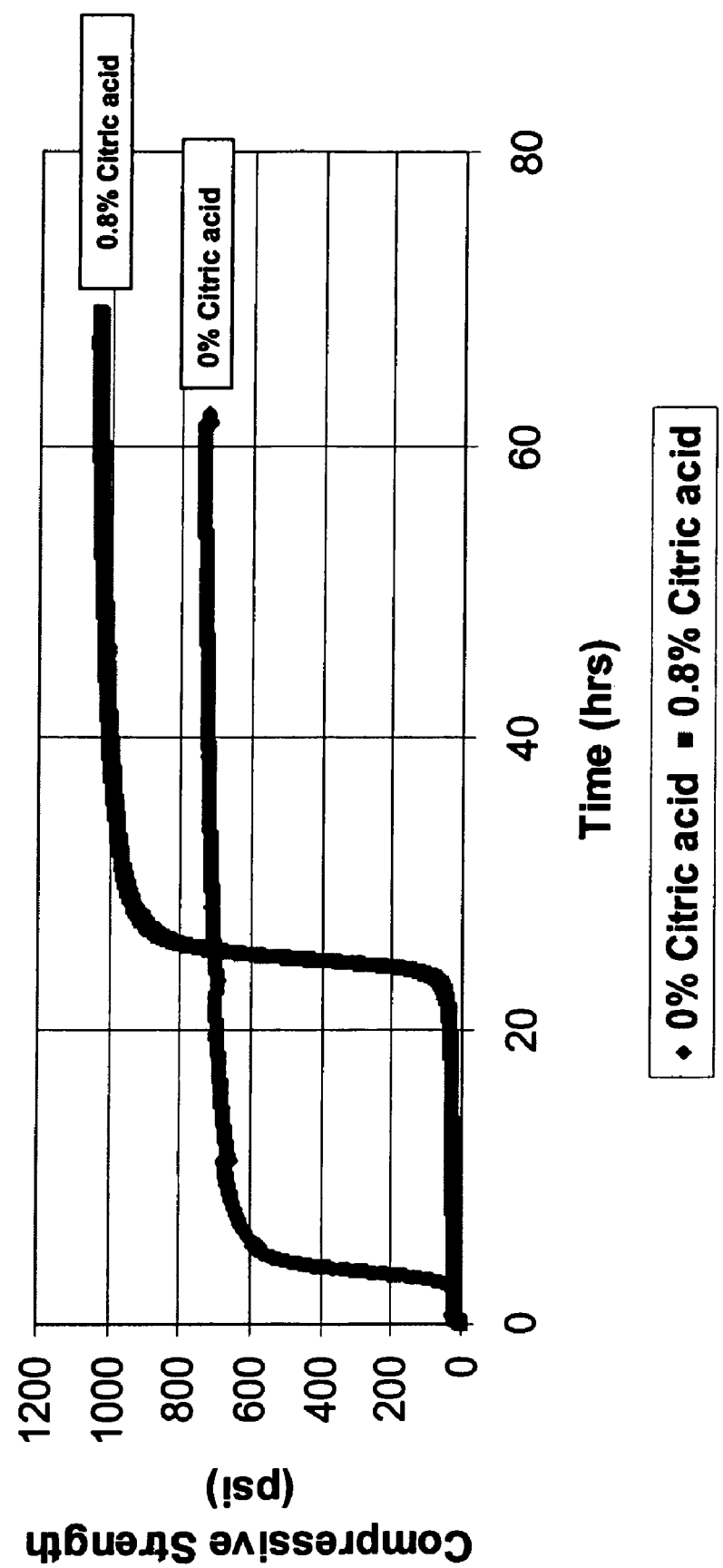

ZEOLITE COMPOSITIONS HAVING ENHANCED COMPRESSIVE STRENGTH

CROSS-REFERENCE TO RELATED APPLICATIONS

This application is a divisional of application Ser. No. 10/822,459 filed Apr. 12, 2004, now U.S. Pat. No. 7,048,053, the entire disclosure of which is incorporated by reference herein, which is a continuation-in-part of application Ser. No. 10/738,199 filed Dec. 17, 2003, now U.S. Pat. No. 7,150,321, the entire disclosure of which is incorporated by reference herein, which is a continuation-in-part of prior application Ser. No. 10/727,370 filed Dec. 4, 2003, now U.S. Pat. No. 7,140,439, the entire disclosure of which is incorporated herein by reference, which is a continuation-in-part of prior application Ser. No. 10/686,098 filed Oct. 15, 2003, now U.S. Pat. No. 6,964,302, the entire disclosure of which is incorporated herein by reference, which is a continuation-in-part of prior application Ser. No. 10/623,443 filed Jul. 18, 2003, the entire disclosure of which is incorporated herein by reference, and which is a continuation-in-part of prior application Ser. No. 10/315,415, filed Dec. 10, 2002, now U.S. Pat. No. 6,989,057, the entire disclosure of which is incorporated herein by reference.

BACKGROUND

Zeolites are known to be pozzolanic materials and may be stabilized with alkali or Portland cement in the presence of sufficient water. In most cases, it is possible to accelerate or retard the setting time by using conventional cement additives. However, it is the final strength of the composition that is of industrial concern.

Conventionally, a wellbore is drilled using a drilling fluid that is continuously circulated down a drill pipe, through a drill bit, and upwardly through the wellbore to the surface. Typically, after a wellbore has been drilled to total depth, the drill bit is withdrawn from the wellbore, and circulation of the drilling fluid is stopped, thereby initiating a shutdown period. During the shutdown period, the drilling fluid is typically left in the wellbore, and a filter cake of solids from the drilling fluid, and additional dehydrated drilling fluid and gelled drilling fluid, typically forms on the walls of the wellbore.

The next operation in completing the wellbore usually involves running a pipe string, e.g., casing, into the wellbore. While the pipe is being run, the drilling fluid left in the wellbore remains relatively static. During that time, the stagnant drilling fluid progressively increases in gel strength, whereby portions of the drilling fluid in the wellbore can become increasingly difficult to displace during subsequent clean-up operations.

After the pipe is run in the wellbore, the next operation typically involves cleaning out the wellbore, which may be accomplished by re-initiating circulation of drilling fluid. The drilling fluid is circulated downwardly through the interior of the pipe and upwardly through the annulus between the exterior of the pipe and the walls of the wellbore, while removing drilling solids, gas, filter cake, dehydrated drilling fluid, gelled drilling fluid, and any other undesired substances needing to be removed from the wellbore.

After clean-up operations are performed in the wellbore, primary cementing operations are typically performed therein. Namely, the pipe is cemented in the wellbore by placing a cement slurry in the annulus between the pipe and the walls of the wellbore. The cement slurry sets into a hard impermeable mass, and is intended to bond the pipe to the walls of the wellbore whereby the annulus is sealed and fluid communication between subterranean zones or to the surface by way of the annulus is prevented.

During any of the above or other operations performed in the wellbore, a number of problems can occur, including difficulty in removing portions of the drilling fluid, or inability to achieve a satisfactory bond between the pipe and the walls of the wellbore because of drilling fluid that remained in the wellbore during primary cementing operations.

Difficulty in removing portions of the drilling fluid is often caused by an increase in the gel strength of the drilling fluid, which is often due to the amount of time the drilling fluid has been left stagnant in the wellbore. In addition, polymeric viscosifiers and additives in the drilling fluid contribute to the formation of a filter cake that is generally very stable and can be difficult to remove. If appreciable drilling fluid and/or filter cake remain in the wellbore or on the walls of the wellbore, a satisfactory bond between the pipe, primary cement and the walls of the wellbore will not be achieved, which can lead to fluid leakage through the annulus and other problems.

Removal of the drilling fluid and filter cake from the wellbore is often attempted by running flushes, washes or spacer fluids through the annulus between the pipe and the walls of the wellbore prior to cementing. Other methods for removing drilling fluid and preventing filter cake from interfering with subsequent primary cementing operations include at least partially displacing the drilling fluid with a settable spotting fluid composition (also referred to as a "settable spotting fluid") before the drilling fluid in the wellbore has had a chance to gain significant gel strength. Conventional settable spotting fluids include a material that sets over time, such as blast furnace slag, fly ash, and similar hydraulic components. Still other methods for achieving satisfactory primary cementing operations when deposits of filter cake are an issue include laying down a filter cake including a settable material on the walls of the wellbore and activating the settable material to set.

The present embodiments provide zeolite compositions having enhanced strength and desirable setting times. In particular, such compositions are useful as wellbore treating fluids in the form of settable spotting fluids in drilling operations.

BRIEF DESCRIPTION OF THE DRAWINGS

FIG. 4 provides a compressive strength versus time plot for compositions lacking citric acid and compositions having 0.8% citric acid.

DESCRIPTION

Figure 1:
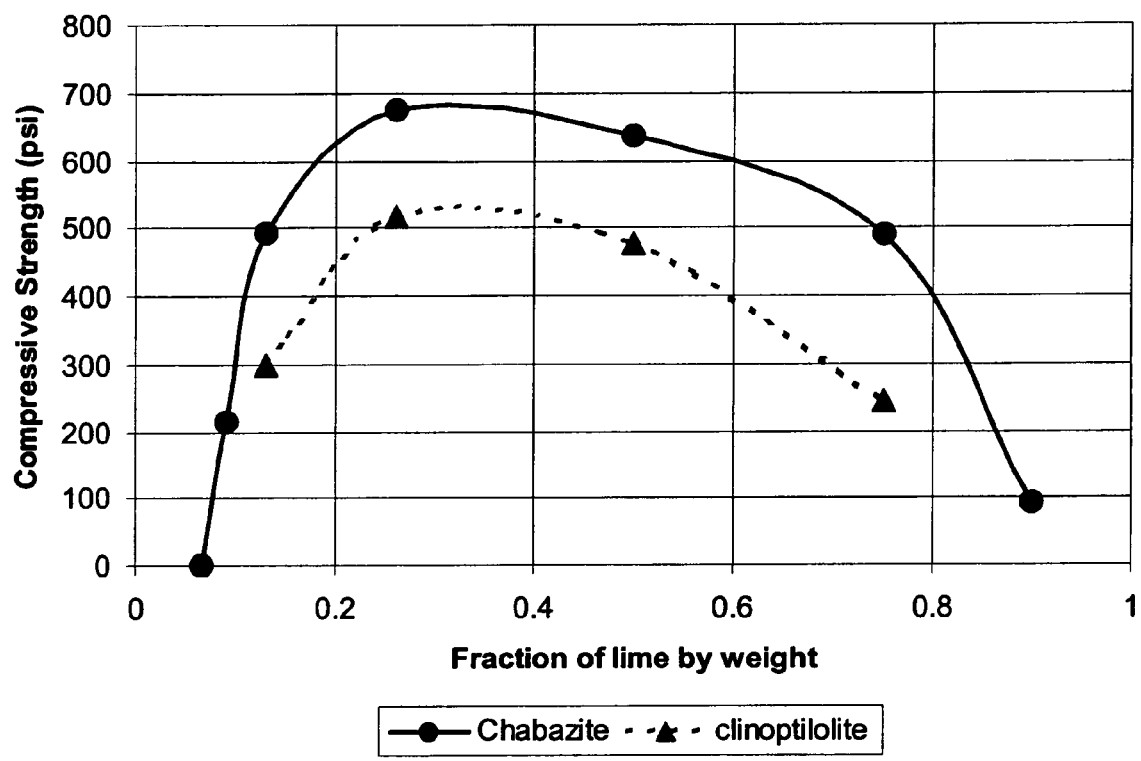
FIG. 1 shows compressive strength in pounds per square inch (psi) from ultrasonic cement analyzer data at 160° F. and 3000 psi for 11.5 pounds per gallon (ppg) slurries versus fraction of lime by weight of zeolite/lime composition. The circles mark data using the zeolite chabazite and the triangles mark data using the zeolite clinoptilolite.

According to embodiments described herein, enhanced compressive strength zeolite compositions are provided having desirable setting times. The final strength or saturated compressive strength of a zeolite composition, i.e., a compressive strength at which further setting time contributes a minimal amount to the compressive strength, is dependent upon the zeolite/activator ratio in the composition, carrier, fluid content, particle size, and reaction temperature and time. Compositions of the present invention are useful as a replacement for hydraulic cement in addition to their use in wellbore treating fluids introduced into a subterranean zone penetrated by a wellbore, particularly wellbore treating fluids introduced as settable spotting fluids. According to the present invention, compositions having such optimized parameters and including certain additives have enhanced compressive strengths for the set composition as compared to set compositions lacking such parameters and additives.

An embodiment of the present invention is a method of increasing compressive strength of a zeolite/activator composition, the method comprising blending a zeolite having a mean particle size less than or equal to 100 microns, an activator at an amount greater than or equal to 5% and less than or equal to 50% by weight of zeolite/activator composition, an organic acid or salt thereof in an amount greater than or equal to 0.1% and less than or equal to 5.0% by weight of zeolite, and a carrier fluid to form a blended composition; and allowing the blended composition to set to form a set composition. The set composition has a greater saturated compressive strength than that of a set zeolite/activator composition lacking the organic acid or salt thereof.

Zeolites: Zeolites are porous alumino-silicate minerals that may be either a natural or manmade material. Manmade zeolites are based on the same type of structural cell as natural zeolites, and are composed of aluminosilicate hydrates having the same basic formula as given below. It is understood that as used in this application, the term "zeolite" means and encompasses all natural and manmade forms of zeolites. All zeolites are composed of a three-dimensional framework of $SiO_4$ and $AlO_4$ in a tetrahedron, which creates a very high surface area. Cations and water molecules are entrained into the framework. Thus, all zeolites may be represented by the crystallographic unit cell formula:

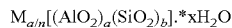

$$M_{a/n}[(AlO_2)_a(SiO_2)_b] \cdot xH_2O$$

where M represents one or more cations such as Na, K, Mg, Ca, Sr, Li or Ba for natural zeolites and $NH_4$, $CH_3NH_3$, $(CH_3)_3NH$, $(CH_3)_4N$, Ga, Ge and P for manmade zeolites; n represents the cation valence; the ratio of b:a is in a range from greater than or equal to 1 and less than or equal to 5; and x represents the moles of water entrained into the zeolite framework.

Preferred zeolites for use in the enhanced strength compositions of the present embodiments include analcime (hydrated sodium aluminum silicate), bikitaite (lithium aluminum silicate), brewsterite (hydrated strontium barium calcium aluminum silicate), chabazite (hydrated calcium aluminum silicate), clinoptilolite (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), stilbite (hydrated sodium calcium aluminum silicate) and thomsonite (hydrated sodium calcium aluminum silicate). Most preferably, the zeolites for use herein include chabazite and clinoptilolite.

Particle sizes of zeolites are measured on a Malvern Particle Size Analyzer, available from Malvern Instruments Ltd., of Worcestershire, UK, for example. For a given particle size, the Particle Size Analyzer identifies the volume percentage of particles in the sample that are beneath that particle size. The Particle Size Analyzer also provides a median particle size. Another parameter reported by the Particle Size Analyzer is the "Span," that describes the width of the distribution independent of the median particle size. As shown in Example 3, two zeolites, clinoptilolite and chabazite, have very similar mean size. However, clinoptilolite has a much higher span, meaning that that zeolite has more particles with larger sizes as compared to chabazite. A smaller sized particle provides a packed or reactive surface area that is greater than the packed or reactive surface area of larger sized particles. With a given zeolite-activator composition, compressive strength is inversely proportional to the span of the particle having comparable mean particle size. Better compressive strengths are obtained from smaller sized particles with a comparable or narrower distribution. According to certain embodiments described herein, the mean particle size for a zeolite is less than or equal to 100 microns. In further embodiments, the mean particle size for a zeolite of the present invention is less than or equal to 90 microns, 80 microns, 70 microns, 60 microns, 50 microns, 40 microns, 30 microns, 20 microns, or 10 microns. In a further embodiment, the mean particle size for a zeolite of the present invention is greater than 1.0 micron and less than or equal to 10 microns.

Activator: The activator is present in the composition in an amount greater than or equal to 5% and less than or equal to 50% by weight of zeolite/activator composition. In further embodiments, the activator is present in the composition in greater than or equal to 10%, 20%, 30%, or 40% by weight of the zeolite/activator composition. In one embodiment, the activator is present in the composition in an amount greater than or equal to 25% and less than or equal to 50% by weight of the zeolite/activator composition. In another embodiment, the activator is present in an amount of about 26% by weight of the zeolite/activator composition. The activator may be one or more of lime, calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, or hydrates thereof. In one embodiment, the activator is calcium hydroxide. Selection of the type and amount of activator depends on the type and make-up of the composition in which the activator is contained, and it is understood by those of ordinary skill in the art how to select a suitable type and amount of activator in light of the present disclosure.

Retarder: The term, "retarder," as used in this application means a composition having properties of slowing the setting time of a zeolite/activator composition. Suitable retarders include but are not limited to one or more of a lignosulfonate, an organic acid having an α-hydroxy group such as citric acid, tartaric acid or gluconic acid, and combinations of both lignosulfonate and organic acid having an α-hydroxy group.

An Organic Acid or Salt Thereof: Suitable organic acids useful in the compositions of the embodiments described herein produce sparingly soluble salts upon reaction with the activator of the zeolite/activator composition. Salts of such acids may also be used in the compositions. Organic acids are mono-, di-, tri- or polycarboxylic acids having up to or including 12 carbon atoms that may or may not retard the setting time of the composition. Organic acids having 11 carbon atoms, 10 carbon atoms, 9 carbon atoms, 8 carbon atoms, 7 carbon atoms, 6 carbon atoms, 5 carbon atoms, 4 carbon atoms, 3 carbon atoms, 2 carbon atoms, or 1 carbon atom are contemplated herein. Examples of carboxylic acids that do not retard the setting time include acetic acid, oxalic acid, or a mono or di-carboxylic acid lacking an hydroxyl group, combinations thereof, as well as alkaline salts thereof such as calcium, potassium, or barium salts, and the like. Examples of carboxylic acids that retard the setting time include carboxylic acids having an α hydroxy group such as citric acid, tartaric acid, gluconic acid, malic acid, lactic acid, combinations thereof, as well as alkaline salts thereof such as calcium, potassium, or barium salts, and the like. The salt of the organic acid may be a cation from the elements of the periodic chart listed in Group I or in Group II. Selection of the type and amount of organic acid or organic acid salt largely depends on the nature and composition of the set composition, and those of ordinary skill in the art will understand how to select a suitable type and amount of organic acid or organic acid salt in light of the present disclosure. Moreover, those of ordinary skill in the art will understand in light of the present disclosure how to exert control over the amount of time that it takes the composition to set by determining, through the exercise of routine experimentation, the amount of organic acid or organic acid salt necessary to achieve a set over a desired period of time. In general, compositions having an amount of organic acid greater than about 5% by weight of the zeolite have an impractically long setting time.

Carrier Fluids: Carrier fluids suitable for use in embodiments of the enhanced compressive strength zeolite compositions of the present invention comprise aqueous fluids, oil-based and synthetic-based fluids, emulsions, acids, or mixtures thereof. Exemplary aqueous fluids include but are not limited to water and water-based gels. When the carrier fluid comprises water, the water can be fresh water, unsaturated salt solution, including brines and seawater, and saturated salt solution. Exemplary oil-based fluids include but are not limited to canola oil, kerosene, diesel oil, fish oil, mineral oil, sunflower oil, corn oil, soy oil, olive oil, cottonseed oil, peanut oil and paraffin. Exemplary synthetic-based fluids include but are not limited to esters, olefins and ethers. Those of ordinary skill in the art will understand that the preferred carrier fluid for the enhanced compressive strength zeolite compositions as provided herein depends upon the properties desired for the compositions, as well as the cost, availability, temperature, stability, viscosity, clarity, and the like of the carrier fluid.

The term, "allowing the blended composition to set to form a set composition," means that setting of the blended composition may occur under a variety of setting conditions including variations in time and temperature. At lower temperatures, the setting time will be longer to achieve a desired compressive strength, while at higher temperatures, the setting time to achieve a desired compressive strength will be shorter. In general, setting temperatures of from about 50° F. to 200° F. are appropriate for setting of the present compositions. In further embodiments, a temperature of 70° F., 90° F., 110° F., 130° F., 140° F., 150° F., 160° F., 170° F., 180° F., or 190° F. is appropriate for setting of the present compositions. The compositions may comprise an amount of about 5 pounds per gallon to about 14 pounds per gallon of carrier fluid, not including any heavy weight additive. In further embodiments, the compositions may comprise an amount of about 6 ppg, 7 ppg, 8 ppg, 9 ppg, 10 ppg, 10.5 ppg, 11 ppg, 11.5 ppg, 12 ppg, 12.5 ppg, or 13 ppg of carrier fluid. Setting may occur at pressures of from and including atmospheric pressure to 3000 psi or higher.

Another embodiment of the present invention is a blended composition comprising a zeolite having a mean particle size less than or equal to 100 microns, an activator at an amount greater than or equal to 5% and less than or equal to 50% by weight of zeolite/activator composition, an organic acid or salt thereof in an amount greater than or equal to 0.1% and less than or equal to 5.0% by weight of zeolite, and a carrier fluid.

A further embodiment of the present invention is a composition comprising chabazite having a mean particle size of greater than or equal to 1.0 micron and less than or equal to 10 microns, calcium hydroxide at an amount greater than or equal to 5% and less than or equal to 50% by weight of chabazite/calcium hydroxide composition, citric acid or salt thereof in an amount of 0.8% by weight of chabazite, and water.

The enhanced compressive strength zeolite compositions of embodiments of the present invention are useful as a replacement for hydraulic cement, such as where cement is to be set in a water environment. Use in oil field operations as described herein provides an embodiment of the invention and assists in addressing difficulty in removing portions of drilling fluid or filter cake from a wellbore.

Another embodiment of the present invention is a method of performing drilling operations. The method comprises penetrating a subterranean zone with a wellbore; introducing a wellbore treating fluid into the well bore, the fluid comprising a blended composition comprising a zeolite having a mean particle size less than or equal to 100 microns, an activator at an amount greater than or equal to 5% and less than or equal to 50% by weight of zeolite/activator composition, an organic acid or salt thereof in an amount greater than or equal to 0.1% and less than or equal to 5.0% by weight of zeolite, and a carrier fluid; and introducing a subsequent composition into the wellbore to displace all but a remaining portion of the wellbore treating fluid from the wellbore.

A further embodiment of the present invention is a method of performing drilling operations comprising penetrating a subterranean zone with a wellbore; introducing a wellbore treating fluid into the wellbore, the fluid comprising a blended composition comprising zeolite having a mean particle size less than or equal to 100 microns, an organic acid or salt thereof in an amount greater than or equal to 0.1% and less than or equal to 5.0% by weight of zeolite, and a carrier fluid; introducing a subsequent composition into the wellbore, the subsequent composition comprising an activator in an amount greater than or equal to 5% and less than or equal to 50% by weight of the zeolite/activator composition, to displace all but a remaining portion of the wellbore treating fluid from the wellbore; and contacting the blended composition in the remaining portion of the wellbore treating fluid with the subsequent composition to form a set composition.

Setting of the zeolite according to the present embodiments is similar to the setting of settable materials in conventional settable spotting fluids, that is, the zeolite sets into a relatively hard mass having a compressive strength greater than a compressive strength of an equivalent material lacking the organic acid or salt thereof. The compressive strength of the set mass formed by the zeolite composition can be measured and compared to compressive strengths of set materials in conventional settable spotting fluids.

In practicing methods according to the present embodiments, drilling fluid (also referred to herein as "mud") remaining in a wellbore during a shutdown period is at least partially displaced with a wellbore treating fluid such as a settable spotting fluid comprising a zeolite composition of the present invention. Preferably, the mud in the wellbore is displaced by the settable spotting fluid before the mud has had a chance to gain significant gel strength. By displacing the mud before it gains significant gel strength, difficulties with removing portions of it during clean-up operations in the wellbore are reduced. As used herein, the term "mud" encompasses any fluid used in hydrocarbon drilling operations, including but not limited to all types of water-base, oil-base and synthetic-base drilling fluids, and fluids that contain significant amounts of suspended solids, emulsified water or oil.

According to one embodiment where a settable spotting fluid comprising zeolite at least partially displaces mud from the wellbore, the settable spotting fluid is subsequently flushed out of the wellbore by washes or spacer fluids circulated through the wellbore. A cement slurry may then be pumped into the annulus and allowed to set, thus bonding the pipe to the walls of the wellbore. The setting of the cement, and consequently the bonding of the pipe to the walls of the wellbore, is improved because difficulties with removing portions of the mud from the wellbore are reduced.

According to another embodiment where a settable spotting fluid comprising zeolite at least partially displaces mud from a wellbore, portions of the settable spotting fluid remain on the walls of the wellbore as part of the filter cake, and/or in permeable areas affecting the wellbore, such as fissures, fractures, caverns, vugs, thief zones, low pressure subterranean zones or high pressure subterranean zones, even if washes or spacer fluids are introduced into the wellbore subsequent to the settable spotting fluid. According to such an embodiment, a subsequent composition, for example, a drilling fluid, pill, spotting fluid or other mud is pumped into the wellbore. The subsequent composition is pumped into the wellbore, either after the settable spotting fluid, or after the washes or spacer fluids, if such are used. When an activator in the subsequent composition contacts the settable spotting fluid remaining in the filter cake and/or permeable areas, the activator causes the zeolite therein to set.

According to yet another embodiment where portions of a settable spotting fluid comprising zeolite remain on the walls of the wellbore as part of the filter cake, and/or in permeable areas affecting the wellbore, primary cementing operations are performed by introducing a cement slurry containing at least one activator into the wellbore. The cement slurry can be introduced after the settable spotting fluid to displace the settable spotting fluid from the wellbore, or can be introduced after a wash or spacer fluid that was pumped into the wellbore after the settable spotting fluid. As the cement slurry is pumped, and as it begins to set in the wellbore, the activator therein diffuses into the settable spotting fluid remaining in the filter cake and/or permeable areas, and causes the zeolite to set. Selection of the type and amount of an activator(s) largely depends on the nature and composition of the cement slurry, and those of ordinary skill in the art will understand in light of the present disclosure how to select a suitable type and amount of activator.

According to yet another embodiment, a settable spotting fluid comprising zeolite, an activator and an organic acid or salt thereof is introduced into a wellbore. Portions of the settable spotting fluid remain on the walls of the wellbore as part of the filter cake, and/or in permeable areas affecting the wellbore, even if washes or spacer fluids are introduced into the wellbore subsequent to the settable spotting fluid. Other drilling operations can proceed, which operations may require other muds, fluids, or compositions to be subsequently pumped into the wellbore. If subsequent muds, fluids, or compositions are pumped into the wellbore, they may or may not comprise a activator.

Thus, in addition to reducing difficulties with removing drilling fluid during clean-up operations, a settable spotting fluid comprising a zeolite composition of the present invention also provides a method by which zeolite remaining in the wellbore after displacement of the settable spotting fluid can be caused to set. Zeolite that sets in permeable areas affecting the wellbore, such as fissures, fractures, caverns, vugs, thief zones, low pressure subterranean zones or high pressure subterranean zones effectively seals such permeable areas, thereby preventing the entry or flow of formation fluids into the annulus.

According to one embodiment, a settable spotting fluid comprising a zeolite/activator/organic acid or organic salt composition of the present invention is prepared by mixing an amount of said composition with a carrier fluid in an amount of from about 100 to about 200 weight percent, based on the weight of the amount of zeolite. According to embodiments where a settable spotting fluid comprising said composition at least partially displaces a mud, the mud can be a water-based drilling fluid, an oil-based drilling fluid, or a synthetic-based drilling fluid.

According to further embodiments of the present invention, the zeolite/activator/organic acid or organic salt compositions may be mixed with cement. The cement may comprise from 0% to 90% of the total weight of the composition.

EXAMPLE 1

Six settable spotting fluids ("Spots") were prepared by combining the components as set forth in TABLE 1 below. Specifically, the zeolite and the hydrated lime were dry-mixed by hand in a glass jar. This dry mix was then added over a 15 second period to a carrier fluid being maintained in a Waring blender at 4,000 RPM. The blender speed was then increased to 12,000 RPM and mixing was continued for 35 seconds.

According to the embodiments illustrated in Table 1, the carrier fluid was water. The amount of hydrated lime and water used to form each settable spotting fluid is reported in the table as a "% bwoZ", which indicates a weight percent based on the weight of the zeolite.

Chabazite was used as the zeolite for Spots 1-4, and clinoptilolite was used as the zeolite for Spots 5-6. Each of these zeolites is commercially available from C2C Zeolite Corporation of Calgary, Canada.

The compressive strength for each of Spots 1-6 was determined by Non-Destructive Sonic Testing as set forth in API Specification 10B 22nd Edition, 1997, of the American Petroleum Institute, the entire disclosure of which is incorporated herein by reference as if reproduced in its entirety. As reported in Table 1, the compressive strength was measured at 160° F. at the reported elapsed times. The measured compressive strength is reported in Table 1 in pounds per square inch (psi).

TABLE 1

| | Spot 1 | Spot 2 | Spot 3 | Spot 4 | Spot 5 | Spot 6 |
|---|---|---|---|---|---|---|
| Components | | | | | | |
| Zeolite (chabazite) wt. % | 100 | 100 | 100 | 100 | 0 | 0 |
| Zeolite (clinoptilolite) wt.% | 0 | 0 | 0 | 0 | 100 | 100 |
| Hydrated Lime (% bwoZ) | 7 | 10 | 15 | 35 | 15 | 35 |
| Water (% bwoZ) | 106 | 109 | 114 | 136 | 114 | 136 |
| Compressive Strength (psi) Measured at 160° F. and at Time | | | | | | |
| Time: 4 Hr | 0 | 280 | 500 | 500 | 250 | 250 |
| Time: 8 Hr | 0 | 290 | 540 | 700 | 340 | 440 |
| Time: 12 Hr | 0 | 290 | 568 | 730 | 350 | 530 |
| Time: 24 Hr | 0 | 290 | 568 | 750 | 374 | 590 |

The compressive strength data indicates that wellbore treating fluids comprising zeolite and water, such as the settable spotting fluids illustrated in Example 1, develop compressive strengths when the amount of an activator, such as lime, is present in an amount greater than about 7% based on the weight of the zeolite. The identity of the activator, zeolite, and carrier fluid may influence the amount of activator necessary to cause the settable spotting fluid to set; thus, in some embodiments, the settable spotting fluid may develop compressive strength with activator amounts less than the 7% illustrated by Example 1. Accordingly, the amount of activator used in practicing the present embodiments need only be at least a compressive strength-developing amount. Those of ordinary skill in the art can determine through the exercise of routine experimentation the amount of an activator sufficient for the development of compressive strength.

The compressive strength data also indicates that wellbore treating fluids comprising zeolite and water, such as the settable spotting fluids of Spots 2-6, develop compressive strengths that are suitable for use with wellbore applications in which conventional settable spotting fluids are used.

The compressive strength data also illustrates that settable spotting fluids comprising zeolite and water develop an early compressive strength, which increases over time. This illustrates that the zeolite will set, and is a satisfactory substitute for settable material, such as blast furnace slag, fly ash and other hydraulic materials, used in conventional settable spotting fluids. In the settable spotting fluids of Example 1, setting of the zeolite was caused by the lime, also known as calcium hydroxide, which is a known activator for converting settable material in conventional settable spotting fluids. Thus, when an activator, such as lime, is brought into contact with a wellbore treating fluid comprising zeolite, such as the settable spotting fluids illustrated herein, the activator causes the zeolite to set.

Contact between an activator and a settable material can be accomplished by various methods well known to those of ordinary skill in the art. The addition of the lime and zeolite together in a settable spotting fluid as described in this example simulates two of the various methods suitable for bringing an activator into contact with the zeolite. According to the first method simulated by this example, zeolite from wellbore treating fluids, such as the settable spotting fluids illustrated herein, remains on the walls of the wellbore as part of the filter cake, and/or in permeable areas affecting the wellbore, such as fissures, fractures, caverns, vugs, thief zones, low pressure subterranean zones or high pressure subterranean zones, even if subsequent washes or spacer fluids are used to displace the wellbore treating fluid. An activator is brought into contact with the zeolite remaining in the wellbore by circulation of a subsequent composition, such as a drilling fluid, pill, spotting fluid or other mud, which contains the activator. According to the second method simulated by this example, an activator is brought into contact with the zeolite remaining in the wellbore by diffusion of an activator contained in a cement slurry that is subsequently pumped into the wellbore during primary cementing operations.

The two methods simulated by this example are exemplary only, as a variety of methods for bringing a settable material into contact with an activator, which are well known to those of ordinary skill in the art, are suitable for use with the present embodiments. Example 2 illustrates yet another method.

EXAMPLE 2

Three settable spotting fluids (Spots 1, 2, and 3) were prepared by combining the components as set forth in TABLE 2A below. Specifically, the zeolite, hydrated lime, and retarder were dry-mixed by hand in a glass jar. This dry mix was then added over a 15 second period to a carrier fluid being maintained in a Waring blender at 4,000 RPM. The blender speed was then increased to 12,000 RPM and mixing was continued for 35 seconds.

According to the embodiment illustrated in Table 2A, the carrier fluid was water. The amount of hydrated lime, retarder and water used to form the settable spotting fluid is reported in the table as a "% bwoZ", which indicates a weight percent based on the weight of the zeolite. Chabazite, which is commercially available from C2C Zeolite Corporation of Calgary, Canada, was used as the zeolite. The retarder comprised a 2/1 lignosulfonate/tartaric acid solution, which is commercially available under the tradename HR-13L from Halliburton Energy Services, Duncan, Okla.

TABLE 2A

| Components | Spot 1 | Spot 2 | Spot 3 |
|---|---|---|---|
| Zeolite (wt. %) (chabazite) | 100 | 100 | 100 |
| Hydrated Lime (% bwoZ) | 15 | 15 | 15 |
| Retarder (HR-13 L) (% bwoZ) | 3.2 | 3.2 | 3.6 |
| Water (% bwoZ) | 97.64 | 97.64 | 97.64 |

The strengths of each of Spots 1, 2 and 3 were then tested at the temperatures and times reported in Table 2B. Up to Day 3, each of Spots 1, 2 and 3 were gelatinous. Thus, the gel strength of each of Spots 1, 2 and 3 was measured according to API Recommended Practice Standard Procedure for Field Testing Drilling Fluids 13B, Appendix B, Shear Strength Measurement using Shearometer Tube, the entire disclosure of which is incorporated herein by reference. The test was performed using a Fann® Model 240 Shearometer, available from Fann Instrument Company, Houston, Tex., and operated according to the Fann® Model 240 Shearometer Instruction Card, the entire disclosure of which is incorporated herein by reference. The gel strength of each of Spots 1, 2 and 3 are reported in Table 2A in pounds per 100 square feet of area ("lb/100 ft$^2$").

After Spots 1, 2 and 3 turned from gelatinous to solid, the compressive strengths at Days 5 and 6 as reported in Table 2B were determined. The compressive strengths are reported in Table 2B in pounds per square inch ("psi"). To determine the compressive strength, each of Spots 1, 2 and 3 were placed in sealed cylindrical plastic containers, 2 inches in diameter by 4 inches in height. Each plastic container was placed in a water bath at the temperature reported in Table 2B, under atmospheric pressure, for the time periods reported in Table 2B. Each plastic container was then removed from the water bath, allowed to cool, and the cylindrical samples were demolded. The top end of each cylindrical sample was cut using a tile saw to give a smooth and level surface. The remainder of the sample was then placed in a Tinius Olsen universal testing machine and the compressive strength determined according to operating procedures for the universal testing machine.

TABLE 2B

Gel Strength and Compressive Strength Measured at Temp ° F. and at Time

| Spot #: Test Temp. | Time Day 1 | Time Day 2 | Time Day 3 | Time Day 4 | Time Day 5 | Time Day 6 |
|---|---|---|---|---|---|---|
| Spot 1: Temp: 140° F. | <10 lb/ 100 ft$^2$ | <10 lb/ 100 ft$^2$ | <10 lb/ 100 ft$^2$ | ~100 lb/ 100 ft$^2$ | gel turned to solid | >250 psi |
| Spot 2: Temp: 160° F. | <10 lb/ 100 ft$^2$ | <10 lb/ 100 ft$^2$ | <10 lb/ 100 ft$^2$ | gel turned to solid | >280 psi | not taken |
| Spot 3: Temp: 190° F. | <10 lb/ 100 ft$^2$ | <10 lb/ 100 ft$^2$ | <10 lb/ 100 ft$^2$ | ~100 lb/ 100 ft$^2$ | gel turned to solid | >230 psi |

The gel strength and compressive strength data indicates that wellbore treating fluids comprising zeolite, water, at least one activator and at least one retarder, such as the settable spotting fluid illustrated in Table 2A, develop strength over time at a range of temperatures. This illustrates that the zeolite will set, and is a satisfactory substitute for settable material, such as blast furnace slag, fly ash and other hydraulic materials, used in conventional settable spotting fluids. The identity of the activator(s), zeolite, retarder(s) and carrier fluid(s) may influence the amount of activator necessary to cause the settable spotting fluid to set, as well as the amount of retarder necessary to slow the set. Accordingly, the amount of activator used in practicing the present embodiments is described as a compressive strength-developing amount. Moreover, the amount of retarder can be adjusted up or down to control the amount of time it takes for the settable spotting fluid to develop strength. Those of ordinary skill in the art can determine a desirable time to achieve a set, and through the exercise of routine experimentation, determine the amount of retarder necessary to achieve a set over the desired period of time. Accordingly, the amounts of activator, zeolite, retarder and carrier fluid as listed in Example 2 are merely an exemplary embodiment.

In the settable spotting fluid illustrated in Example 2, the activator (i.e., the lime) caused the zeolite to set, while the retarder slowed the set so that setting occurred over time. This illustrates yet another method for bringing an activator into contact with the zeolite in portions of settable spotting fluid that remains in the wellbore.

Moreover, the present embodiments provide a method for performing drilling operations wherein a wellbore treating fluid comprising zeolite, such as the settable spotting fluids illustrated by Examples 1 and 2, at least partially displaces a mud used to drill a wellbore. Preferably, the mud is displaced by the settable spotting fluid comprising zeolite before the mud has had an opportunity to develop a gel strength significant enough to make its displacement difficult. After the mud is at least partially displaced by the settable spotting fluid, a cement slurry may then be pumped into the annulus. The cement slurry is allowed to set, thus bonding the pipe to the walls of the wellbore. The setting of the cement, and consequently the bonding of the pipe to the walls of the wellbore, is improved because difficulties with removing portions of the drilling fluid in the wellbore are reduced.

EXAMPLE 3

Six settable compositions were prepared by combining the components as set forth in TABLE 3A below. Zeolite and the hydrated lime (calcium hydroxide) were dry-mixed by hand in a glass jar. This dry mix was added over a 15 second period to a carrier fluid being maintained in a Waring blender at 4,000 RPM. The blender speed was then increased to 12,000 RPM and mixing was continued for 35 seconds.

According to the embodiments illustrated in Table 3A, the carrier fluid was water. The amount of hydrated lime used to form each settable composition is reported in the table as a fraction by weight of the total zeolite/lime hydrate composition. The amount of water used was an amount sufficient to adjust the slurry density to 11.5 ppg in each case.

Chabazite and clinoptilolite were used as the zeolites. Each of these zeolites is commercially available from C2C Zeolite Corporation of Calgary, Canada.

The compressive strength for each composition was determined by Non-Destructive Sonic Testing as set forth in API Specification 10B 22nd Edition, 1997, of the American Petroleum Institute, the entire disclosure of which is incorporated herein by reference as if reproduced in its entirety. As reported in Table 3A and in FIG. 1, the compressive strength was measured at 160° F. at a saturated compressive strength, i.e., at a point where further setting time contributes a minimal amount to the compressive strength. FIG. 4 shows compressive strength reaching a plateau. The measured compressive strength is reported in Table 3A in pounds per square inch (psi) and in megapascals (MPa).

TABLE 3A

| | Lime | Chabazite | | Clinoptilolite | |
|---|---|---|---|---|---|
| Zeolite (fraction by weight) | hydrate (fraction by weight) | Compressive Strength (psi) | Compressive Strength (MPa) | Compressive Strength (psi) | Compressive Strength (MPa) |
| 0.909 | 0.091 | 215 | 1.48 | — | |
| 0.87 | 0.13 | 493 | 3.40 | 299 | 2.06 |
| 0.74 | 0.26 | 675 | 4.65 | 517 | 3.56 |
| 0.5 | 0.5 | 637 | 4.39 | 477 | 3.29 |
| 0.25 | 0.75 | 490 | 3.38 | 245 | 1.69 |
| 0.1 | 0.9 | 92 | 0.63 | — | |

Figure 2:
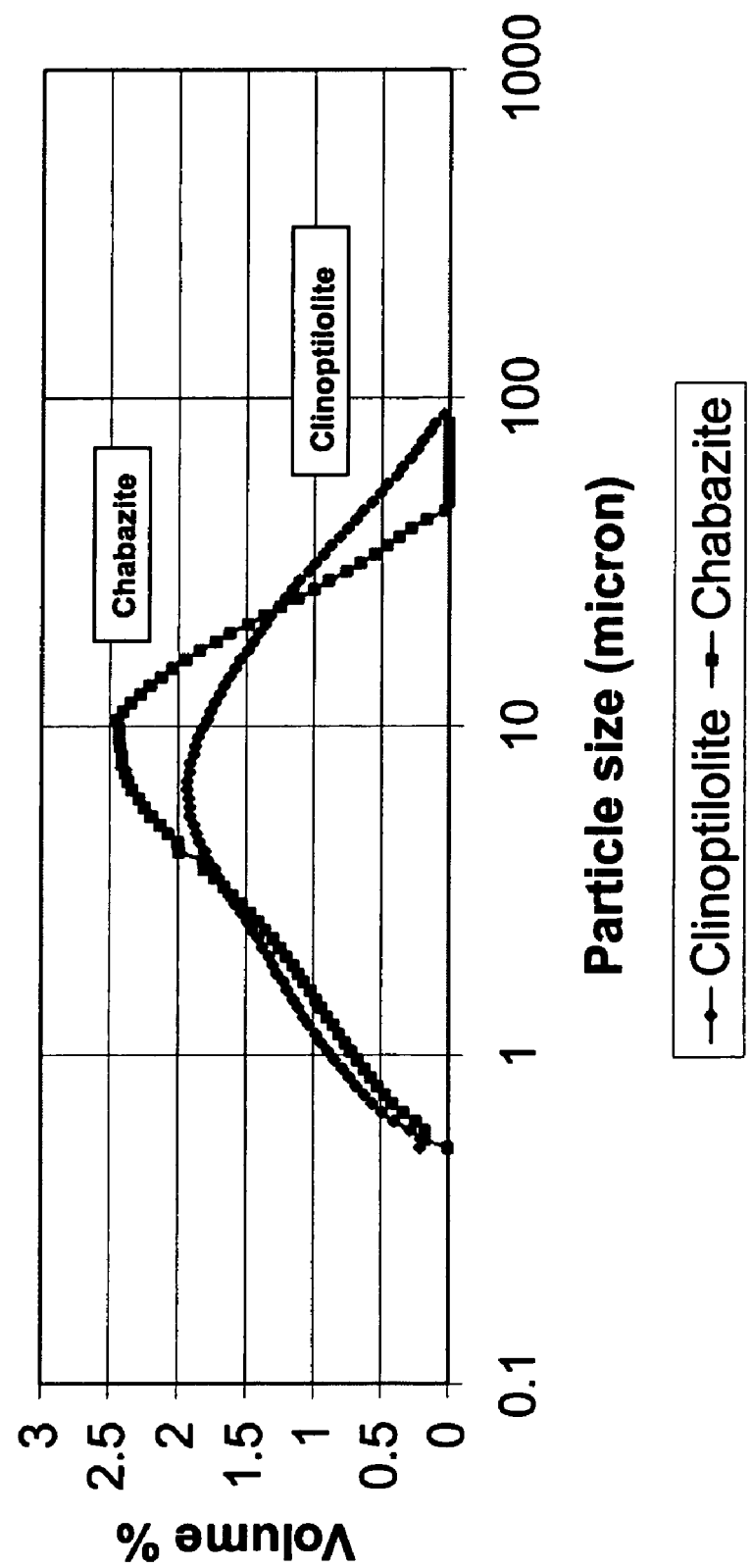
FIG. 2 shows particle size histographs for chabazite and clinoptilolite as described in Example 3.

FIG. 2 and Table 3B show the volume percent of particles having the indicated particle size for the zeolites, chabazite and clinoptilolite. The particle sizes were measured on a Malvern Particle Size Analyzer, available from Malvern Instruments Ltd., of Worcestershire, UK. For a given particle size, the Particle Size Analyzer identifies the volume percentage of particles in the sample that are beneath that particle size. The Particle Size Analyzer also provides a median particle size. Another parameter reported by the Particle Size Analyzer is the "span," which describes the width of the distribution independent of the median particle size.

TABLE 3B

| Particle Size (microns) | Volume % of Particles Having Less Than the Indicated Particle Size | |
| --- | --- | --- |
| | Chabazite | Clinoptilolite |
| 0.525 | 0.17 | 0.21 |
| 1.03 | 5.65 | 6.68 |
| 2.14 | 18.23 | 20.65 |
| 3.09 | 27.26 | 29.74 |
| 4.19 | 36.59 | 38.41 |
| 5.03 | 42.98 | 43.99 |
| 6.05 | 49.83 | 49.73 |
| 7.26 | 56.98 | 55.50 |
| 8.21 | 61.81 | 59.29 |
| 9.27 | 66.67 | 63.01 |
| 10.48 | 71.51 | 66.61 |
| 11.14 | 73.85 | 68.37 |
| 12.59 | 78.32 | 71.79 |
| 13.38 | 80.44 | 73.45 |
| 19.30 | 91.09 | 82.54 |
| 42.71 | 100 | 96.05 |
| 57.97 | 100 | 98.97 |
| 88.91 | 100 | 100 |
| Mean Diameter | 3.44 microns | 3.31 microns |
| Span | 2.81 microns | 4.371 microns |

Even though both the zeolites of Table 3B and FIG. 2 have very similar mean size, clinoptilolite has a much higher span, meaning that that zeolite has more particles with larger sizes as compared to chabazite. A smaller sized particle provides a packed or reactive surface area that is greater than the packed or reactive surface area of larger sized particles. With a given zeolite-lime composition, compressive strength is inversely proportional to the span of the particle having comparable mean particle size. Better compressive strengths are obtained from smaller sized particles with a comparable or narrower distribution.

Figure 3:
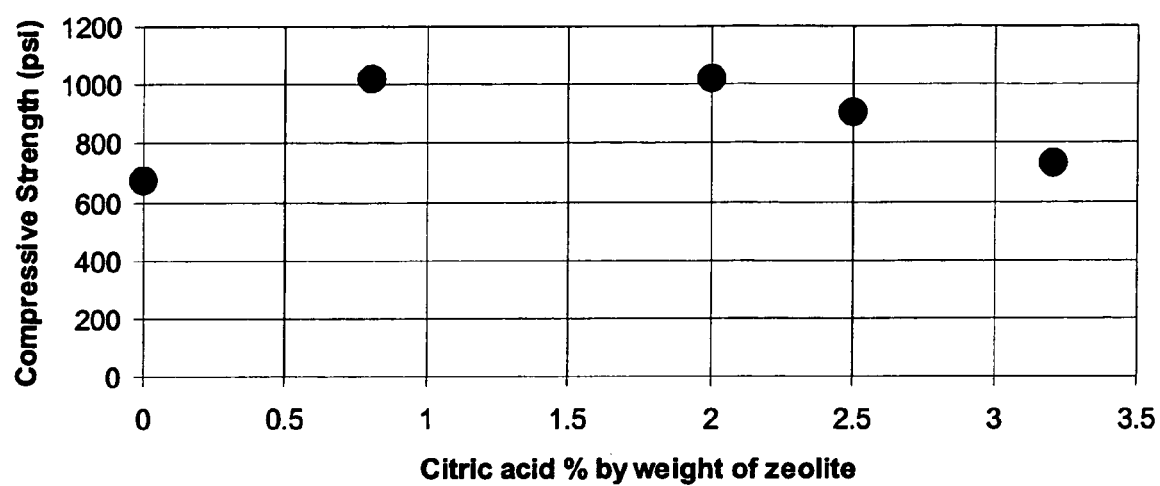
FIG. 3 shows compressive strength in pounds per square inch (psi) from ultrasonic cement analyzer data at 160° F. and 3000 psi for 11.5 ppg slurries versus amount of citric acid in percent by weight of zeolite. The ratio of zeolite and activator in the composition is 74:26.

The ratio of zeolite and lime hydrate having the highest compressive strength data from Table 3A (74:26, chabazite and lime hydrate, having a compressive strength of 675 psi and 4.65 MPa) was chosen for studies in which varying amounts of an organic acid were added to the compositions and the resultant compressive strength measured. In the present studies, citric acid was dry-mixed with the zeolite and lime hydrate. Table 3C provides data on compressive strength in both pounds per square inch and megapascals versus percent citric acid by weight of zeolite. Measurements were carried out at 160° F. and 3000 psi for an 11.5 ppg slurry in each case. Citric acid is a conventional cement retarder and has been demonstrated herein to be a strength enhancer. As shown in Table 3C and FIG. 3, enhancement in the compressive strength is observed with citric acid in an amount greater than zero and up to and including 3.2% by weight of zeolite. In particular, up to 51% enhancement in the compressive strength with amounts of citric acid at about 0.8%-2.0% by weight of zeolite is observed.

TABLE 3C

| % citric acid | Compressive Strength (psi) | Compressive Strength (MPa) |
| --- | --- | --- |
| 0 | 675 | 4.65 |
| 0.8 | 1020 | 7.03 |
| 2.0 | 1021 | 7.03 |
| 2.5 | 905 | 6.24 |
| 3.2 | 734 | 5.06 |

For embodiments where the organic acid is normally a liquid, for example acetic acid, a salt of the acid is dry mixed with the other dry ingredients to provide the acid. For example, 2% calcium acetate was used to provide an acetic acid carboxylate moiety in an embodiment where the organic acid was acetic acid. Acetic acid is an example of an organic acid that does not retard the setting time of the zeolite composition.

Table 3D shows the length of time for setting to 500 psi for compositions having 74:26 of chabazite and lime hydrate, and having citric acid present. FIG. 4 provides a plot of compressive strength in pounds per square inch versus time for compositions lacking citric acid and for compositions and having 0.8% citric acid present.

TABLE 3D

| % Citric acid by weight of zeolite | Length of time to reach 500 psi |
| --- | --- |
| 0 | 5 hours |
| 0.8 | 25 hours |
| 2.5 | 44 hours |
| 3.2 | 6 days |

The data of Table 3D show that set time increases with increasing amount of citric acid. A set time of 25 hours is obtained at 0.8% citric acid, a concentration of acid where the compressive strength had reached a maximum under the tested conditions as shown in Table 3C.

The identity of the activator, the zeolite, the organic acid or salt thereof, and the carrier fluid may influence the amount of organic acid or salt thereof necessary to cause the composition to set; thus, in some embodiments, the composition may develop compressive strength with organic acid or salt thereof at amounts greater or less than the 0.8% illustrated as optimum by Tables 3C and 3D. Accordingly, the amount of organic acid or salt thereof used in practicing the present embodiments need only be at least a compressive strength-enhancing amount. Those of ordinary skill in the art can determine through the exercise of routine experimentation the amount of an organic acid or salt thereof sufficient for the enhancement of compressive strength.

The compressive strength data indicate that a wellbore treating fluid comprising zeolite, an activator, water, and an organic acid or salt thereof will set, and is a satisfactory substitute for settable material, such as a zeolite/activator/water material lacking an organic acid or salt thereof, blast furnace slag, fly ash and other hydraulic materials used in conventional settable spotting fluids as described supra. Further, it is understood that any wellbore treating fluid such as a drilling, completion or stimulation fluid including, but not limited to, a drilling mud, cement composition, remedial composition, well cleanup fluid, workover fluid, spacer fluid, gravel pack fluid, acidizing fluid, fracturing fluid, conformance fluid and the like can be prepared using zeolite, an activator, an organic acid or salt thereof, and a carrier fluid.

While certain embodiments described herein relate to wellbore treating fluids provided as settable spotting fluids, it is understood that any wellbore treating fluids such as drilling, completion and stimulation fluids including, but not limited to, drilling muds, cement compositions, remedial compositions, well cleanup fluids, workover fluids, spacer fluids, gravel pack fluids, acidizing fluids, fracturing fluids, conformance fluids and the like can be prepared using the compositions herein. Accordingly, improved methods of the present invention comprise preparing a wellbore treating fluid using a composition of the present invention, as described herein, and placing the fluid in a subterranean formation. Other methods according to the present embodiments include performing drilling operations, completing and/or stimulating a subterranean formation, and performing primary cementing operations using a wellbore treating fluid comprising a composition of the present invention.

Other embodiments of the present invention will be apparent to those skilled in the art from a consideration of this specification or practice of the embodiments disclosed herein. However, the foregoing specification is considered merely exemplary of the present invention with the true scope and spirit of the invention being indicated by the following claims.

The references cited herein, to the extent that they provide exemplary procedural or other details supplementary to those set forth herein, are specifically incorporated by reference.

As used herein and unless otherwise indicated, the terms "a" and "an" are taken to mean "one", "at least one" or "one or more".

What is claimed is:

1. A method of performing wellbore operations comprising:
    treating the wellbore with a composition comprising:
        (a) a zeolite having a mean particle size less than or equal to 100 microns, the zeolite being represented by the formula:

$M_{a/n}[(AlO_2)_a(SiO_2)_b] \cdot xH_2O$ where
        M represents one or more cations selected from the group consisting of Na, K, Mg, Ca, Sr, Li, Ba, NH$_4$, CH$_3$NH$_3$, (CH$_3$)$_3$NH, (CH$_3$)$_4$N, Ga, Ge and P;
        n represents the cation valence;
        b:a ratio is in a range from greater than or equal to 1 and less than or equal to 5; and
        x represents number of moles of water entrained into the zeolite framework,
        (b) an activator in an amount of greater than or equal to 5% and less than or equal to 50%, by total weight of zeolite and activator,
        (c) an organic acid or salt thereof in an amount of greater than or equal to 0.1% and less than or equal to 5.0% by weight of zeolite, and
        (d) a carrier fluid; and
    allowing the composition to set in the wellbore.

2. The method of claim 1 wherein the zeolite comprises analcime, bikitaite, brewsterite, chabazite, clinoptilolite, faujasite, harmotome, heulandite, laurnontite, mesolite, natrolite, paulingite, phillipsite, scolecite, stellerite, stilbite, or thomsonite.

3. The method of claim 1 wherein the activator comprises calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, or mixtures thereof.

4. The method of claim 1 wherein the carrier fluid comprises a water-based carrier fluid in an amount of from about 100 to about 200 percent by weight of the zeolite.

5. The method of claim 1 wherein the organic acid or salt thereof comprises acetic acid, an organic carboxylic acid having an α-hydroxy group, or a combination thereof.

6. The method of claim 5 wherein the organic carboxylic acid having an □-hydroxy group comprises citric acid, tartaric acid, or gluconic acid.

7. The method of claim 1 wherein the zeolite has a mean particle size of greater than or equal to 1.0 micron and less than or equal to 10 microns.

8. The method of claim 7 wherein the activator is present in an amount of greater than or equal to 20% and less than or equal to 30% by weight of the zeolite and the activator.

9. The method of claim 1 wherein the organic acid or salt thereof is present in an amount of greater than or equal to 0.5% and less than or equal to 1.0% by weight of zeolite.

10. The method of claim 9 wherein the organic acid or salt thereof is citric acid.

11. A method of performing drilling operations comprising:
    penetrating a subterranean zone with a wellbore; and
    introducing a wellbore treating fluid into the well bore, wherein the wellbore treating fluid comprises:
        (a) a zeolite having a mean particle size less than or equal to 100 microns, the zeolite being represented by the formula:

$M_{a/n}[(AlO_2)_a(SiO_2)_b] \cdot xH_2O$ where
        M represents one or more cations selected from the group consisting of Na, K, Mg, Ca, Sr, Li, Ba, NH$_4$, CH$_3$NH$_3$, (CH$_3$)$_4$NH, (CH$_3$)$_4$N, Ga, Ge and P;
        n represents the cation valence;
        b:a ratio is in a range from greater than or equal to 1 and less than or equal to 5; and
        x represents number of moles of water entrained into the zeolite framework,
        (b) an activator in an amount of greater than or equal to 5% and less than or equal to 50%, by total weight of zeolite and activator,
        (c) an organic acid or salt thereof in an amount of greater than or equal to 0.1% and less than or equal to 5.0% by weight of zeolite, and
        (d) a carrier fluid.

12. The method of claim 11 further comprising:
    introducing a subsequent composition into the wellbore to displace all but a remaining portion of the wellbore treating fluid from the wellbore; and
    allowing the remaining portion of the wellbore treating fluid to set.

13. The method of claim 12 wherein the remaining portion of the wellbore treating fluid is in one or more of a filter cake, fissure, fracture, cavern, vug, thief zone, low pressure subterranean zone, and high pressure subterranean zone in the wellbore.

14. The method of claim 11 wherein the activator comprises calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, or mixtures thereof.

15. The method of claim 11, wherein the zeolite comprises analcime, bikitaite, brewsterite, chabazite, clinoptilolite, faujasitc, harmotome, heulandite, laumontite, mesolite, natrolite, paulingite, phillipsite, scolecite, stellerite, stilbite, or thomsonite.

16. The method of claim 11 wherein the carrier fluid comprises a water-based carrier fluid in an amount of from about 100 to about 200 percent by weight of the zeolite.

17. The method of claim 11 wherein the carrier fluid comprises water or water-based gels.

18. The method of claim 11 wherein the carrier fluid comprises a carrier fluid selected from the group consisting of fresh water, unsaturated salt solution, brine, seawater, saturated salt solution, canola oil, kerosene, diesel oil, fish oil, mineral oil, sunflower oil, corn oil, soy oil, olive oil, cottonseed oil, peanut oil and paraffin.

19. The method of claim 11 wherein the penetrating of the subterranean zone with a wellbore comprises drilling the wellbore with a mud, and wherein the introducing of the wellbore treating fluid at least partially displaces the mud from the wellbore.

20. A method of performing wellbore operations comprising:

treating the wellbore with a treating fluid comprising:
(a) a zeolite having a mean particle size less than or equal to 100 microns, the zeolite being represented by the formula:

$M_{a/n}[(AlO_2)_a(SiO_2)_b] \cdot xH_2O$ where
M represents one or more cations selected from the group consisting of Na, K, Mg, Ca, Sr, Li, Ba, NH$_4$, CH$_3$NH$_3$, (CH$_3$)$_4$NH, (CH$_3$)$_4$N, Ga, Ge and P;
n represents the cation valence;
b:a ratio is in a range from greater than or equal to 1 and less than or equal to 5; and
x represents number of moles of water entrained into the zeolite framework,
(b) an activator in an amount of greater than or equal to 5% and less than or equal to 50%, by total weight of zeolite and activator,
(c) an organic acid or salt thereof in an amount of greater than or equal to 0.1% and less than or equal to 5.0% by weight of zeolite, and
(d) a carrier fluid; and displacing all but a remaining portion of the treating fluid from the wellbore;

introducing at least one composition selected from a mud, a spotting fluid, a pill and a cement slurry into the wellbore; and allowing the remaining portion of the treating fluid in the wellbore to set.

21. The method of claim 20 wherein the zeolite comprises analcime, bikitaite, brewsterite, chabazite, clinoptilolite, faujasite, harmotome, heulandite, laumontite, mesolite, natrolite, paulingite, phillipsite, scolecite, stellerite, stilbite, or thomsonite.

22. The method of claim 20 wherein the activator in the treating fluid comprises calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, or mixtures thereof.

23. The method of claim 20 wherein the selected composition comprises an activator selected from the group consisting of calcium hydroxide, sodium silicate, sodium fluoride, sodium silicofluoride, magnesium silicofluoride, zinc silicofluoride, sodium carbonate, potassium carbonate, sodium hydroxide, potassium hydroxide, sodium sulfate, and mixtures thereof.

24. The method of claim 20 wherein the organic acid or salt thereof comprises acetic acid, an organic carboxylic acid having an α-hydroxy group, or a combination thereof.

25. The method of claim 24 wherein the organic carboxylic acid having an □-hydroxy group comprises citric acid, tartaric acid, or gluconic acid.

26. The method of claim 20 wherein the zeolite has a mean particle size of greater than or equal to 1.0 micron and less than or equal to 10 microns.

* * * * *